(12) United States Patent
Tokoro et al.

(10) Patent No.: US 7,826,570 B2
(45) Date of Patent: Nov. 2, 2010

(54) RECEIVER AND RECEIVING METHOD FOR DETERMINING AN OUTPUT SIGNAL HAVING MINIMUM ERROR AMONG OUTPUT SIGNALS

(75) Inventors: Kenichi Tokoro, Kamakura (JP); Masami Aizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 954 days.

(21) Appl. No.: 11/511,330

(22) Filed: Aug. 29, 2006

(65) Prior Publication Data
US 2007/0201589 A1 Aug. 30, 2007

(30) Foreign Application Priority Data
Aug. 30, 2005 (JP) .............................. 2005-249969

(51) Int. Cl.
*H04B 7/10* (2006.01)
*H04L 1/02* (2006.01)
(52) U.S. Cl. .................... 375/347; 375/316; 375/346
(58) Field of Classification Search .............. 375/347, 375/316, 346
See application file for complete search history.

(56) References Cited

U.S. PATENT DOCUMENTS 6,385,181 B1 * 5/2002 Tsutsui et al. ............... 370/335

2002/0136334 A1 * 9/2002 Nagayasu ................... 375/350
2005/0090205 A1 4/2005 Catreux-Erceg et al.
2006/0280113 A1 * 12/2006 Huo ........................... 370/208

FOREIGN PATENT DOCUMENTS

| JP | 05-167490 | 7/1993 |
|---|---|---|
| JP | 11-220430 | 8/1999 |
| JP | 2000-286769 | 10/2000 |
| JP | 2003-51768 | 2/2003 |
| SG | 200003137-7 | 6/2000 |

OTHER PUBLICATIONS

Katsushi Sanda, et al., "A Study on Antenna Directional Pattern Control Scheme for Mobile Reception of Terrestrial Digital Broadcasting", IPSJ SIG Technical Report, 2003-ITS-15, vol. 2003, No. 114, Nov. 14, 2003, pp. 91-95.

* cited by examiner

*Primary Examiner*—David C Payne
*Assistant Examiner*—Brian J Stevens
(74) *Attorney, Agent, or Firm*—Oblon, Spivak, McClelland, Maier & Neustadt, L.L.P.

(57) ABSTRACT

A receiver has a plurality of synthesizers configured to synthesize signals received by N pieces of antennas by using weighted coefficients different from each other, where N is an integer of two or more, a determination part configured to determine an output signal having a minimum error among output signals of the plurality of synthesizers in units of a predetermined transmission unit, and a re-synthesis part configured to sequentially re-synthesize and output a signal determined to have the minimum error by the determination part.

3 Claims, 6 Drawing Sheets

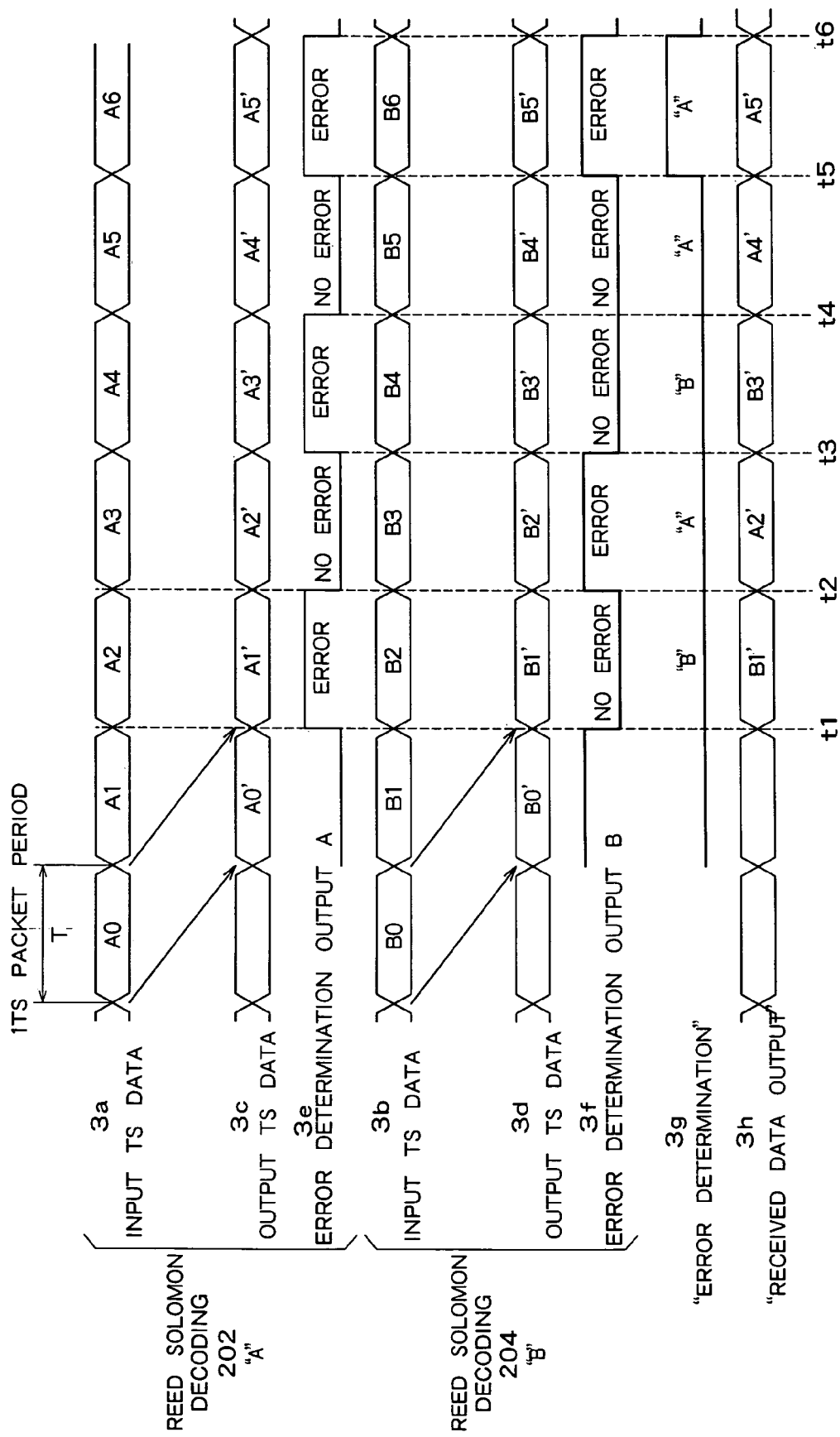
F I G. 4

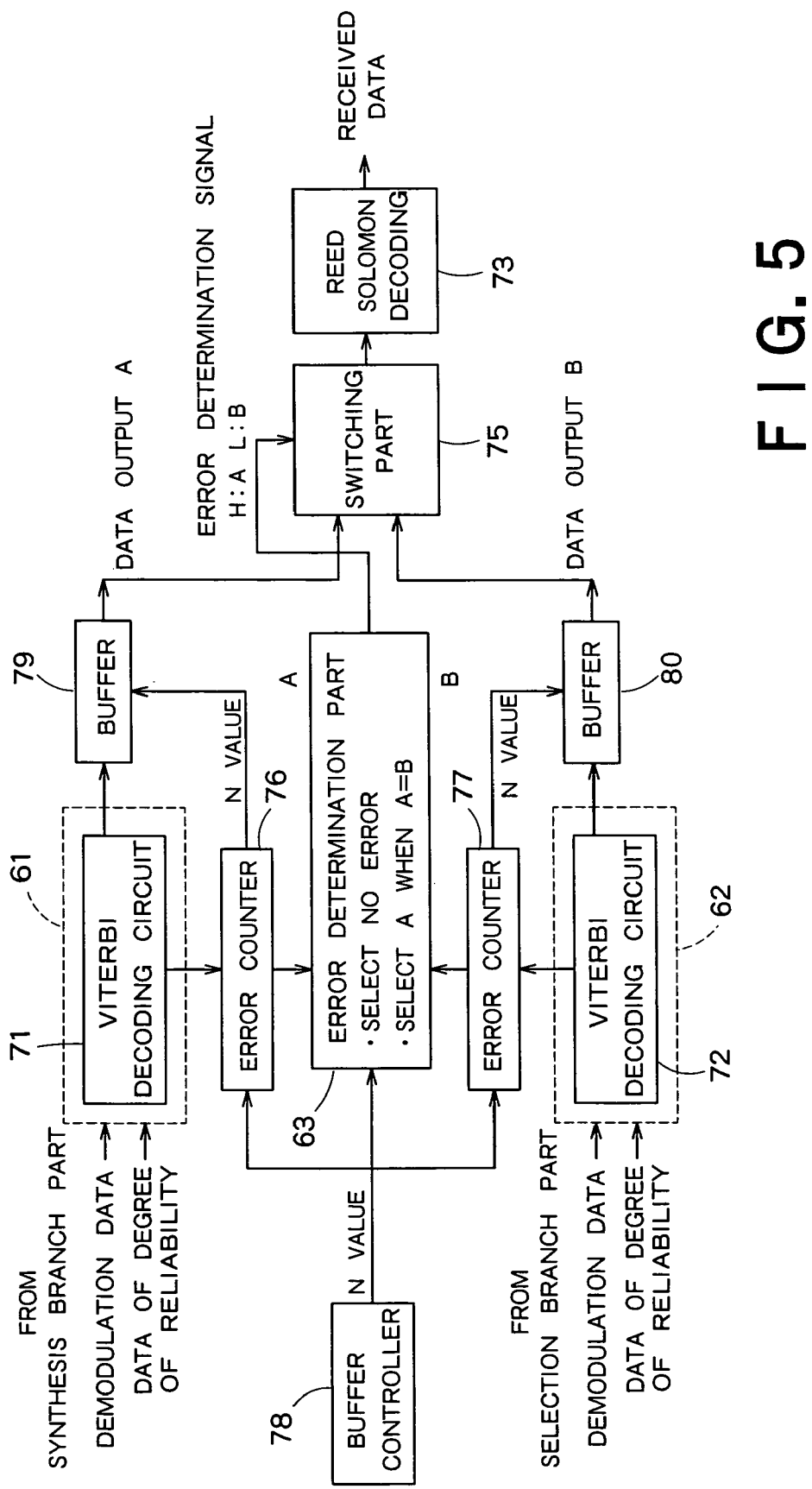
F I G. 5

RECEIVER AND RECEIVING METHOD FOR DETERMINING AN OUTPUT SIGNAL HAVING MINIMUM ERROR AMONG OUTPUT SIGNALS

CROSS REFERENCE TO RELATED APPLICATIONS

This application is based upon and claims the benefit of priority from the prior Japanese Patent Application No. 2005-249969, filed on Aug. 30, 2005, the entire contents of which are incorporated herein by reference.

BACKGROUND OF THE INVENTION

1. Field of the Invention

The present invention relates to a receiver and a receiving method for synthesizing signals received by a plurality of antennas.

2. Related Art

In a terrestrial digital broadcast using an OFDM (Orthogonal Frequency Division Multiplexing) scheme, there is a request in which it is desirable to receive high-definition broadcast to be received by a fixed equipment even in a mobile object such as a vehicle. In order to fulfill such a request, as a technique of improving the received quality of the mobile object, there has been known a directional control technique using multiple antennas (see Japanese Patent Laid-open Pub. No. 2003-51768 and "a method relating to a directional control manner on reception of the terrestrial digital broadcast under mobile environment", Information Processing Societies, 2003-ITS-15).

According to the receiver described in the above non-patent document, weighted coefficients different from each other are given to the signals received by multiple antennas to perform a weighted processing, and then a synthesized processing is performed.

On the other hand, according to a receiver described in the above patent document, S/N ratios of the respective signals received by multiple antennas are detected to select a signal having the most excellent S/N ratio.

There is an advantage in which a reception scheme of the above non-patent document can eliminate an interfering wave in Gaussian form. Contrary, when a part of a plurality of received paths connected to multiple antennas does not normally operate due to some reason, there is a disadvantage in which a signal quality of a synthesized signal lowers due to the influence.

On the other hand, the reception scheme of the above patent document has an advantage in which even if a part of a plurality of received paths does not normally operate, if at least one of a plurality of received paths normally operates, the most suitable received result is obtained. Contrary, according to the above patent document, there is a disadvantage in which if the received status of all the received paths is not good, the reception quality deteriorates extremely.

SUMMARY OF THE INVENTION

According to one embodiment of the present invention, a receiver, comprising:

a plurality of synthesizers configured to synthesize signals received by N pieces of antennas by using weighted coefficients different from each other, where N is an integer of two or more;

a determination part configured to determine an output signal having a minimum error among output signals of the plurality of synthesizers in units of a predetermined transmission unit; and a re-synthesis part configured to sequentially re-synthesize and output a signal determined to have the minimum error by the determination part.

According to one embodiment of the present invention, a receiver, comprising:

a plurality of S/N ratio detectors configured to detect S/N ratios of the signals received by N pieces of antennas, where N is an integer of two or more;

a selector configured to select a received signal of the antenna having the most excellent S/N ratio among the S/N ratios detected by the plurality of S/N ratio detectors;

a plurality of synthesizers configured to synthesize signals having frequency bandwidths different from each other included in the signals received by the N pieces of antennas by using weighted coefficients different from each other;

a bandwidth synthesizer configured to synthesize output signals of the plurality of synthesizers; and an error correction part configured to select the signal having fewer error of the signal selected by the selector and the signal synthesized by the bandwidth synthesizer, and to perform error correction with respect to the selected signal.

BRIEF DESCRIPTION OF THE DRAWINGS

FIG. 4 is a timing diagram showing one example of operational timing of FIG. 3.

FIG. 5 is a block diagram showing internal configuration of an error correction part according to a third embodiment of the present invention.

DETAILED DESCRIPTION OF THE INVENTION

Hereinafter, a receiver and a receiving method according to the present invention will be described more specifically with reference to the drawings.

First Embodiment

Figure 1:
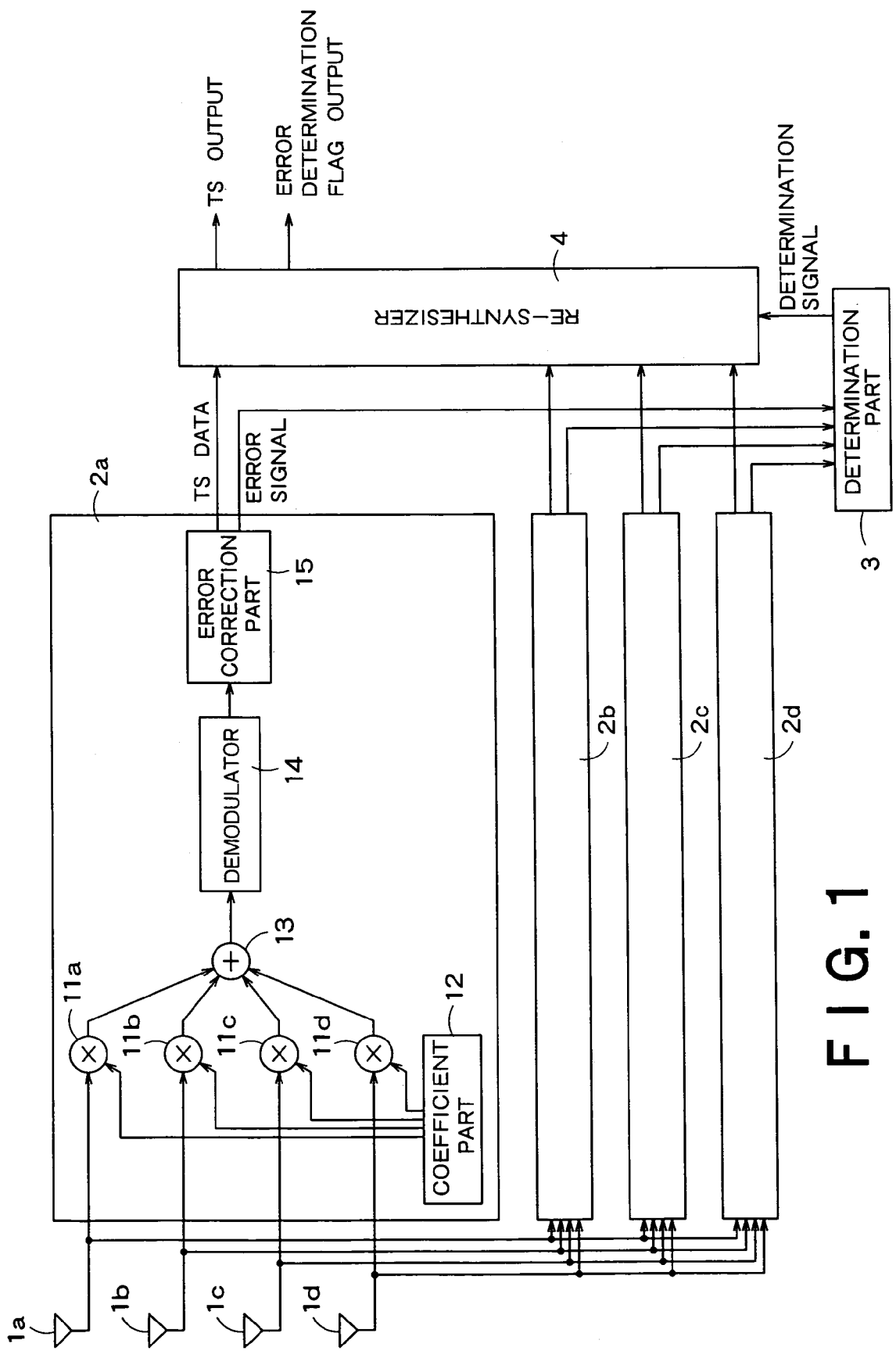
FIG. 1 is a block diagram showing schematic configuration of a receiver according to a first embodiment of the present invention.

FIG. 1 is a block diagram showing schematic configuration of a receiver according to a first embodiment of the present invention. The receiver of FIG. 1 has N pieces of antennas $1a$-$1d$, where N is an integer of 2 or more, a plurality of synthesizers $2a$-$2d$ which synthesize signals received by the antennas $1a$-$1d$ using weighted coefficients different from each other, a determination part 3 which determines a signal with a minimum error among output signals of the synthesizers $2a$-$2d$ for every a predetermined time period, and a re-synthesizer 4 which re-synthesizes and outputs the signal determined to have a minimum error by the determination part 3.

There is no limitation to the number of the antennas $1a$-$1d$. Hereinafter, an example of providing four antennas $1a$-$1d$ will be described. The synthesizers $2a$-$2d$ have four multipliers 11a-11d provided corresponding to the received signals of the antennas 1a-1d, a coefficient part 12 which supplies the weighted coefficients different from each other to the multipliers 11a-11d, an adder 13 which synthesizes outputs of the multipliers 11a-11d, a demodulator 14 which performs demodulation processing based on an output signal of the adder 13, and an error correction part 15 which performs an error correction for an output signal of the demodulator 14.

The coefficient part 12 generates the weighted coefficients supplied to the multipliers 11a-11d based on some means such as the received levels of each antennas 1a-1d or the output signal level of the adder 13. The multipliers 11a-11d perform a processing which multiplies the received signals of the antennas 1a-1d by the respective weighted coefficients supplied from the coefficient part 12.

The weighted coefficients generated by the coefficient parts 12 in the synthesizers 2a-2d are different from each other. Therefore, the receiver of FIG. 1 is provided with 4×4=16 kinds of the weighted coefficients.

There is no special limitation what kind of weighted coefficients the coefficient parts 12 in the synthesizers 2a-2d generates. For example, the weighted coefficients generated by the coefficients 12 in the synthesizers 2a-2d may be designated by an external signal.

The synthesizers 2a-2d output TS (Transport Stream) data after error correction and an error signal indicating that error correction is impossible. The TS data is supplied to the re-synthesizer 4, and the error signal is supplied to the determination part 3.

The determination part 3 determines the synthesizer having a minimum error based on the error signals outputted from the synthesizers 2a-2d, and supplies a determination signal indicative of the determination result to the re-synthesizer 4. The re-synthesizer 4 selects the TS data having a minimum error based on the determination signal to re-synthesize final TS data. More specifically, the determination processing of the determination part 3 is performed in predetermined transmission units such as in units of a bit, a byte or a packet. Therefore, the re-synthesizer 4 performs the re-synthesized processing which switches selection of the TS data in predetermined transmission units and then connects the selected TS data.

When the error signals outputted from all the synthesizers 2a-2d include an error having a predetermined reference value or more, the re-synthesizer 4 selects the TS data outputted from one of the synthesizers, for example, the synthesizer 2a to perform the re-synthesized processing. Similarly, when the error signals outputted from a plurality of synthesizers 2a-2d include only an error which is less than the predetermined reference value and similar to those of the other synthesizers, the re-synthesizer 4 selects the TS data outputted from one among the synthesizers 2a-2d to perform the re-synthesized processing.

As described above, according to the first embodiment, the weighted coefficients set by the synthesizers 2a-2d are varied to perform demodulation and error correction, and then the TS data having a minimum error is ultimately selected. Therefore, even if received quality of at least a part of the received path is not good, there is no likelihood of suffering the influence, thereby improving the received quality.

Second Embodiment

A second embodiment uses both of a synthesized branch for performing a bandwidth division and a bandwidth synthesis and a selection branch for selecting a signal path having the most excellent S/N ratio.

Figure 2:
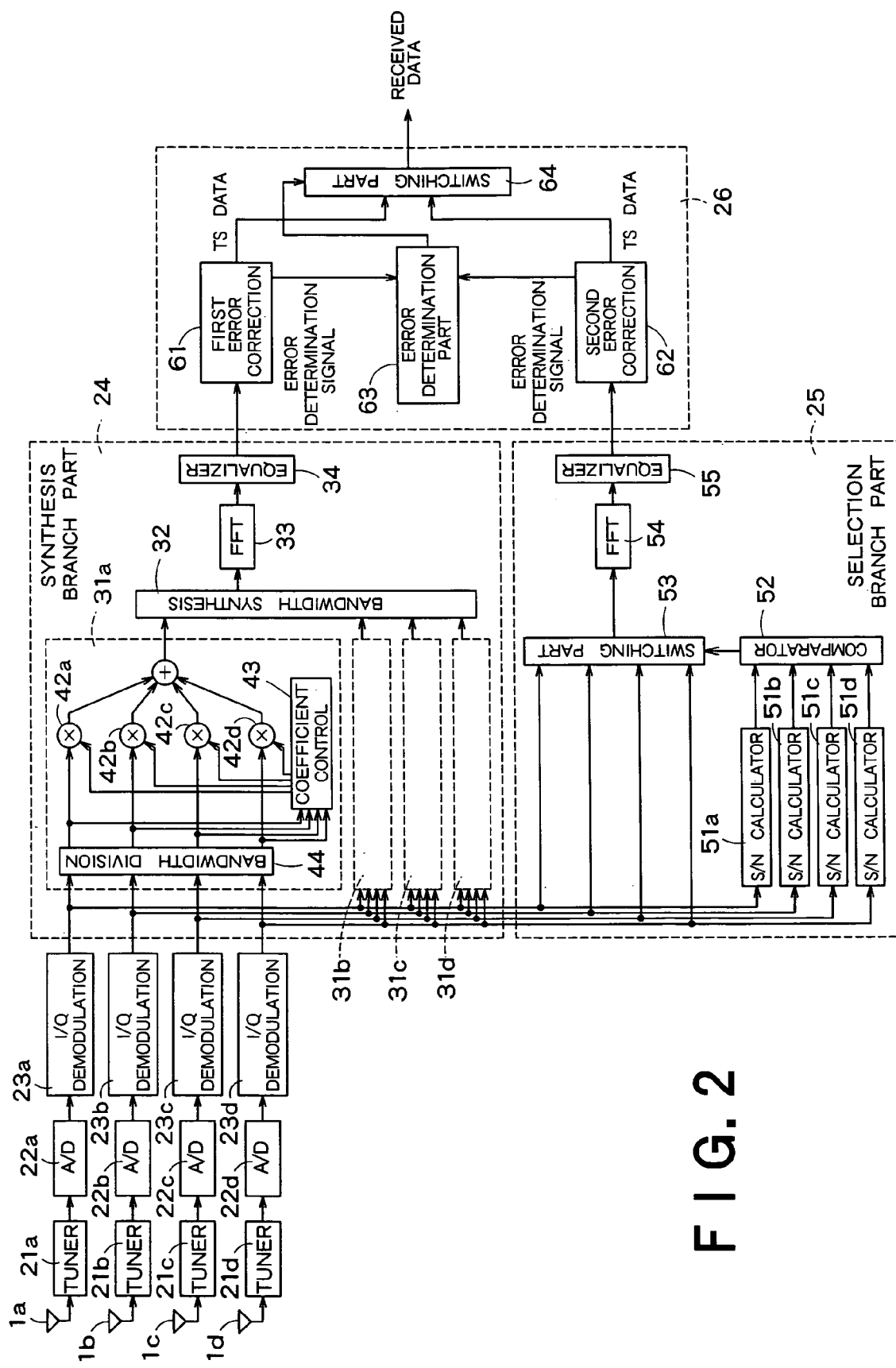
FIG. 2 is a block diagram showing schematic configuration of a receiver according to a second embodiment of the present invention.

FIG. 2 is a block diagram showing schematic configuration of a receiver according to the second embodiment of the present invention. The receiver of FIG. 2 has four antennas 1a-1d, four tuners 21a-21d which are connected to the antennas 1a-1d and extract signal components having predetermined bandwidths, four A/D converters 22a-22d which convert output signals of the tuners 21a-21d into digital signals, four I/Q demodulators 23a-23d which demodulate output signals of the A/D converters 22a-22d into I data and Q data, a synthesis branch part 24 and a selection branch part 25 connected in parallel to the I/Q demodulators 23a-23d, and an error correction part 26 which performs error correction of an output signal of the synthesis branch part 24 and an output signal of the error correction part 25.

The synthesis branch part 24 has a plurality of synthesizers 31a-31d, a bandwidth synthesis part 32 which performs the bandwidth synthesis with respect to the outputs of the synthesizers 31a-31d, an FFT part 33 and an equalizer 34.

Although there is no special limitation to the number of the synthesizers 31a-31d, at least two synthesizers are necessary. The synthesizers 31a-31d perform the bandwidth division to perform the weighted processing and the synthesized processing with respect to the signals of signal bandwidths different from each other. More specifically, the synthesizers 31a-31d has a bandwidth divisional part 41 which extracts signal compositions of signal bandwidths different from each other, a plurality of multipliers 42a-42d which multiply the received signals of the antennas 1a-1d, i.e. I data and Q data, by the respective weighted coefficients different from each other, a coefficient control part 43 which generates the weighted coefficients supplied to the multipliers 42a-42d and an adder 44 which synthesizes outputs of the multipliers 42a-42d.

The outputs of the synthesizers 31a-31d have signal bandwidths different from each other, and the bandwidth synthesis part 32 performs the bandwidth synthesis to generate one signal. Subsequently, the FFT part 33 performs a fast Fourier transformation (FFT) processing, and then the equalizer 34 performs a correction processing in a time axis direction and a frequency direction.

In this way, the synthesis branch part 24 performs the bandwidth division with respect to the received signals of the antennas 1a-1d, and then the synthesizers 31a-31d perform the weighted processing and the synthesis processing in accordance with the antennas 1a-1d. After that, the bandwidth synthesis is performed. Therefore, even if the interfering wave in Gaussian form is present, it is possible to cancel the interfering wave, thereby improve the received quality.

On the other hand, the selection branch part 25 has four S/N detectors 51a-51d provided corresponding to the received signals of the antennas 1a-1d, a comparator 52 which compares the S/N ratios detected by the S/N detectors 51a-51d and detects the received path of the antennas 1a-1d having the most excellent S/N ratio, a switching part 53 which selects the received path detected by the comparator 52, an FFT part 54 which performs the FFT processing with respect to the signal of the received path selected by the switching part 53, and an equalizer 54 connected to a subsequent stage of the FFT part 54.

In this way, the selection branch part 25 selects the received signal, i.e. I data and Q data, having the most excellent S/N ratio among the received signals of the antennas 1a-1d. Therefore, even if the received quality of a part among a plurality of received paths is extremely bad, if there is one or more correctly received path, there is no likelihood that the received quality deteriorates.

The error correction part 26 has a first error correction part 61 which performs error correction with respect to the output of the synthesis branch part 24, a second correction part 62 which performs error correction with respect to the output of the selection branch part 25, an error determination part 63 which determines which of the output of the synthesis branch part 24 or the output of the selection branch part 25 includes more errors, and a switching part 64 which selects either of the output of the synthesis branch part 24 or the output of the selection branch part based on a result of determining the error determination part 3.

Figure 3:
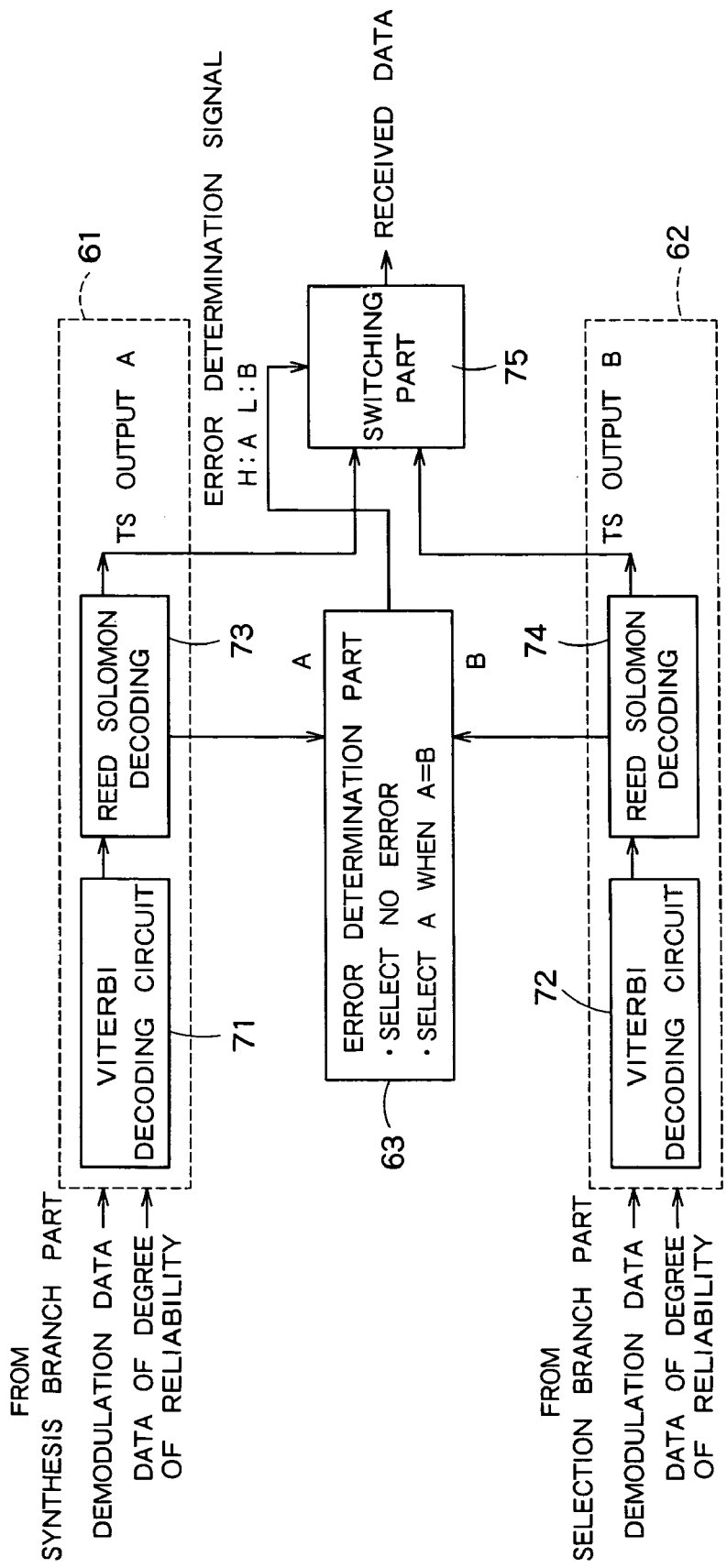
FIG. 3 is a block diagram showing one example of a detailed internal configuration of an error correction part.

FIG. 3 is a block diagram showing one example of a detailed internal configuration of the error correction part 26. The first and second error correction parts 61 and 62 have Viterbi decoding circuits 71 and 72, and Reed-Solomon decoding circuits 73 and 74, respectively. Each of the Viterbi decoding circuits 71 and 72 is provided with I data and Q data from the synthesis branch part 24 or the selection branch part 25, and data of degree of reliability expressing a numeric value relating to degree of reliability of data. The Viterbi decoding circuits 71 and 72 weight the I data and Q data with the data of degree of reliability to change a distance between codes, thereby improving Viterbi decoding ability.

The Reed Solomon decoding circuits 73 and 74 perform the decoding processing, for example, in units of one packet, and output the TS data indicative of the decoded result and the error signal. The error signal is outputted when the error which overtakes error ability is included in data. The error signal is supplied to the error determination part 63. The error determination part 3 selects the branch part having fewer errors in principle. When both of the branch parts have the error, or neither of the branch parts has any error, the output of the synthesis branch part 24 is selected.

FIG. 4 is a timing diagram showing one example of operational timing of FIG. 3. FIG. 4 shows the input data and the output data of the Reed Solomon decoding circuits 73 and 74, and the output data of the error determination part 3.

The time period T1 of FIG. 4 shows one packet transmission period. The time periods t1-t2, t3-t4 and t5-t6 show one example in which the Reed Solomon decoding circuit 73 detects the error, and the Reed Solomon decoding circuit 74 does not detect the error. The time periods t2-t3 and t4-t5 show one example in which the Reed Solomon decoding circuit 73 does not detect the error and the Reed Solomon decoding circuit 74 detects the error.

In FIG. 4, the switching part 53 selects the output TS data of the Reed Solomon decoding circuits 73 and 74 during the time periods t1-t2, t3-t4 and t5-t6, and selects the output TS data of the Reed Solomon decoding circuits 73 and 74 during the time period t2-t3 and t4-t5.

As described above, according to the second embodiment, the reception processing is performed by combining the synthesis branch part 24 and the selection branch part 25, and one branch part having fewer errors of both branch parts is ultimately selected in units of one packet. Therefore, it is possible to perform the reception processing having the advantages of both branch parts, thereby improving the received quality.

Third Embodiment

A third embodiment detects the error by the Viterbi decoding circuits 71 and 72, and performs the Reed Solomon decoding after selecting the branch part.

The third embodiment is different from the second embodiment in a configuration of the error correction part 26. Hereinafter, different points will be mainly described.

FIG. 5 is a block diagram showing internal configuration of the error correction part 26 according to the third embodiment of the present invention. The first and second error correction parts 61 and 62 in the error correction part 26 have only the respective Viterbi decoding circuits 71 and 72. The Reed Solomon decoding circuit 73 is provided in a subsequent stage of the switching part 75.

The Viterbi decoding circuits 71 and 72 perform the Viterbi decoding based on the I data and the Q data outputted from the respective branch parts and data of degree of reliability to output the decoding data and a decoding error signal in units of one bit. The number of the decoding error signal is counted by the error counters 76 and 77. The error counters 76 and 77 count the number of the decoding error signals included in the number of bytes set to the buffer controller 78. Data decoded by the Viterbi decoding circuits 71 and 72 is stored in the buffers 79 and 80 for the number of bytes set by the buffer controller 78, and then is supplied to the switching part 53.

The reason why the error counters 76 and 77 are provided is that there is a characteristic in which it is possible to accurately determine whether the decoding error has occurred when the decoding errors are accumulated during a certain period, because there is a tendency in which the decoding error occurs intensively in a burst form when the Viterbi decoding is performed, and there is no assurance that the decoding error occurs in sync with the decoding data.

Figure 6:
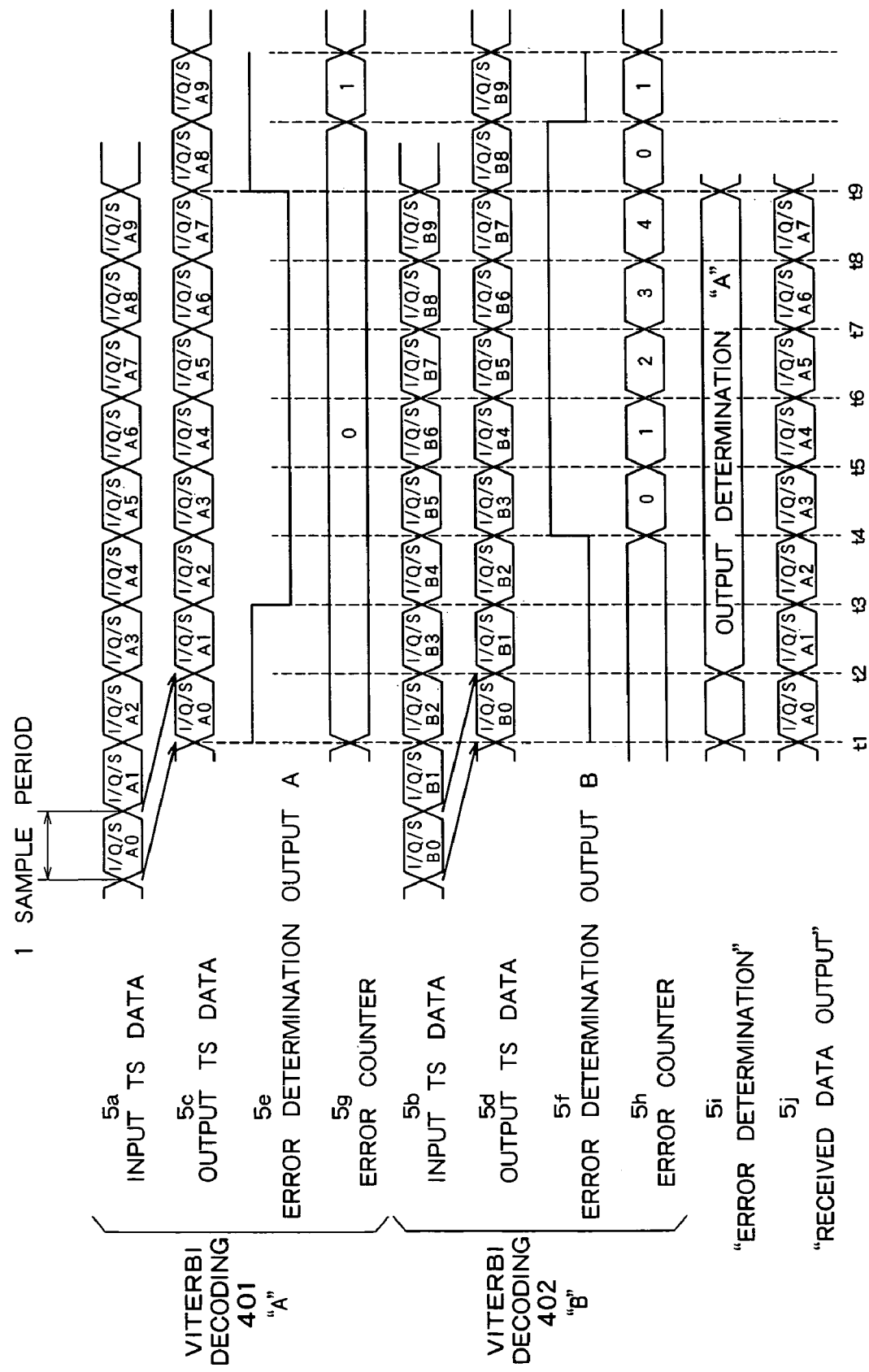
FIG. 6 is an operational timing diagram corresponding to FIG. 5.

FIG. 6 is an operational timing diagram corresponding to FIG. 5. The operational timing diagram shows one example in which the buffer controller 78 designates 8 byte as buffer size.

At time t1, the decoding processing is started. At time t2, the Viterbi decoding circuit 71 connected to the synthesis branch part 24 detects the error, and the error counter 76 is counted up by 1. After that, the Viterbi decoding circuit 71 does not detect the error, and the error counter 76 holds 0. At time t9 of reaching the limited amount of the buffer 79, the error counters 76 and 77 are initially set to 0.

On the other hand, the Viterbi decoding circuit 72 connected to the selection branch part 25 detects the error at time t4, and then sequentially detects the error. Because of this, at time t8 just before reaching the limited amount of the buffer 80, the error counter 77 becomes 4.

In the example of FIG. 6, the error determination outputs are compared in units of one byte. It is found that the output of the synthesis part 24 has the error fewer than the output of the selection branch part 25. Therefore, the switching part 75 selects the output of the buffer 79 corresponding to the synthesis branch part 24 to provide the output of the buffer 79 to the Reed Solomon decoding circuit.

As described above, according to the third embodiment, the error determination is performed based on the processing result of the Viterbi decoding circuits 71 and 72. There is no necessity to provide two Reed Solomon decoding circuit 73. Therefore, it is possible to perform the error determination by using more simplified circuit than that of the second embodiment.

What is claimed is:

1. A receiver, comprising:
 a plurality of synthesizers configured to synthesize signals received by N pieces of antennas by using weighted coefficients different from each other, where N is an integer of two or more;
 a determination part configured to determine an output signal having a minimum error among output signals of the plurality of synthesizers in units of a predetermined transmission unit; and a re-synthesis part configured to sequentially re-synthesize and output a signal determined to have the minimum error by the determination part, wherein each of the plurality of synthesizers outputs Transport Stream (TS) data after error correction and an error signal indicating that error correction is impossible;

the determination part determines the synthesizer having the minimum error based on the error signal for each transmission unit; and when the error signals outputted from the plurality of synthesizers include the errors which are less than predetermined reference values and have similar value, the re-synthesizer selects the TS data outputted from one of the plurality of synthesizers to perform a re-synthesis processing.

2. The receiver according to claim 1, wherein the transmission unit is in units of a bit, a byte or a packet.

3. The receiver according to claim 1, wherein when the error signals outputted from the plurality of synthesizers include the errors equal to or more than predetermined reference values, the re-synthesizer selects the TS data outputted from one of the plurality of synthesizers to perform a re-synthesis processing.

* * * * *